US011864089B2

(12) United States Patent
Vellore et al.

(10) Patent No.: US 11,864,089 B2
(45) Date of Patent: Jan. 2, 2024

(54) PEER-ASSISTED, OUT-OF-BAND DISCOVERY OF A SINGLE-BAND WIRELESS ACCESS POINT

(71) Applicant: Cypress Semiconductor Corporation, San Jose, CA (US)

(72) Inventors: Vivek R. Vellore, Bangalore (IN); Prashant Kota, Bengaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 202 days.

(21) Appl. No.: 17/540,931

(22) Filed: Dec. 2, 2021

(65) Prior Publication Data

US 2023/0180105 A1   Jun. 8, 2023

(51) Int. Cl.
   *H04W 48/10*   (2009.01)
   *H04W 76/10*   (2018.01)
(52) U.S. Cl.
   CPC ........... *H04W 48/10* (2013.01); *H04W 76/10* (2018.02)
(58) Field of Classification Search
   None
   See application file for complete search history.

(56) References Cited

U.S. PATENT DOCUMENTS

| 9,554,324 | B2 | 1/2017 | Chu et al. | |
| 2007/0014267 | A1* | 1/2007 | Lam | H04W 48/10 |
| | | | | 370/338 |
| 2022/0116858 | A1* | 4/2022 | Sugaya | H04W 72/0453 |

OTHER PUBLICATIONS

David Coleman, "The road to AP Discovery in 6 GHz", Extreme Networks, Aug. 25, 2021, 8 pages.
Thomas Derham, et al., "Considerations on 6 GHz Discovery", IEEE 802.11, Nov. 12, 2018, 14 pages.
David Coleman, "The Off-Road Trail to 6 GHz AP Discovery", Extreme Networks, Sep. 3, 2021, 11 pages.

* cited by examiner

Primary Examiner — Hong S Cho

(57) ABSTRACT

Implementations disclosed describe systems and methods that include establishing, by a wireless device, a communication link with a wireless access point (AP) device over an operating channel, the wireless AP device providing a single-band access within a first frequency band; time-multiplexing, by the wireless device, transmitting beacons or probes within a second frequency band with communicating with the wireless AP device over the operating channel within the first frequency band; and configuring the beacons or probes to advertise, to other wireless devices in the second frequency band, availability of connection to the wireless AP device over the operating channel within the first frequency band.

20 Claims, 6 Drawing Sheets

US 11,864,089 B2

PEER-ASSISTED, OUT-OF-BAND DISCOVERY OF A SINGLE-BAND WIRELESS ACCESS POINT

TECHNICAL FIELD

The disclosure pertains to improving connection to wireless networks, and more specifically, to a peer-assisted, out-of-band discovery of a single-band wireless access point (AP) device.

BACKGROUND

Access point devices of wireless networks facilitate wireless communication (transmission and reception) with various client devices (stations). With wireless communication growth into higher frequency bands, particularly now into the 6 gigahertz (GHz) band, also referred to as 6E, performing typical scanning by wireless stations for an operating channel of a wireless access point (AP) device has become more time consuming. This is because, according to IEEE 802.11ax protocol specification, wireless stations are to passively scan 15 preferred scanning channels (PSCs) in the 6 GHz band in addition to scanning a default number of channels in the 2.4 GHz and 5 GHz bands. This default number is 14 channels in the 2.4 GHz band and 25 channels in the 5 GHz bands. At approximately 100 milliseconds (ms) per channel that is passively scanned, a wireless station (such as a mobile device, a smart phone, a tablet, or the like) can potentially be delayed between seven to ten seconds just determining the proper operating channel of the wireless AP to which to connect. In wireless access technology, this is a significant delay when trying to connect to a 6 GHz-only wireless AP device.

DETAILED DESCRIPTION

Figure 1:
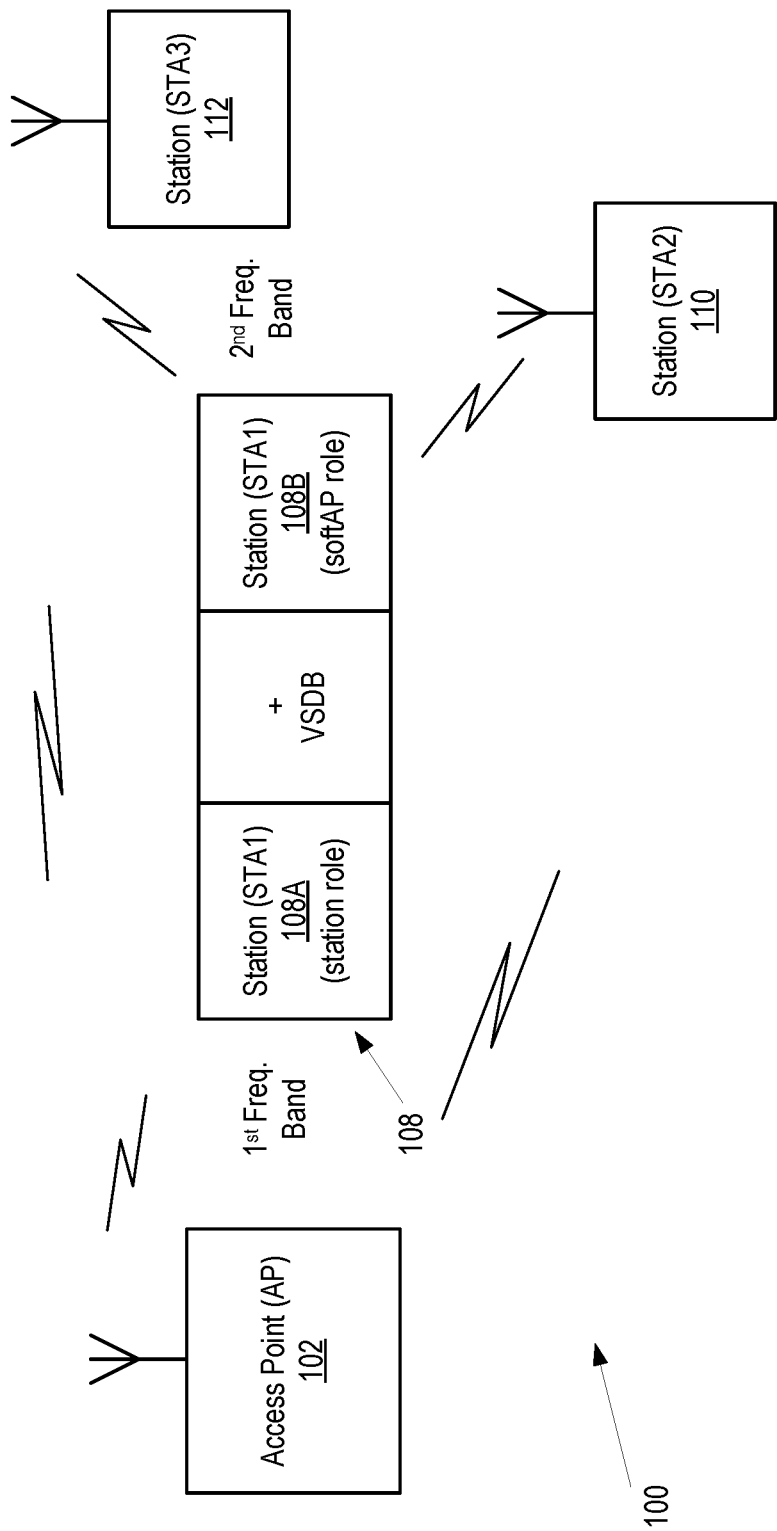
FIG. 1 is a simplified block diagram of a wireless network including a first wireless device acting as a dual-role station (STA1) to help inform other wireless devices of an operating channel within a frequency band of a single-band wireless AP device according to various embodiments.

The disclosed embodiments are directed to a peer-assisted, out-of-band discovery of a single-band wireless AP device. As discussed, the scanning performed by a wireless device to discover an operating channel of a wireless AP device is time consuming and can exhibit poor quality of service for devices that experience long latencies before the operating channel is found. Although some of these delays have been shortened due to requiring preferred scanning channels (PSC) in the 6 GHz frequency band (shortening the list of channels to be scanned from 59 to 15), there are still significant delays.

The relatively new Wi-Fi® 6E standard generated by the Wi-Fi® Alliance requires channels to be at least 80 GHz in width and many are 160 GHz wide, providing wider bandwidth for each channel. As before, these channels are partitioned into 20 megahertz (MHz) sections, one of which is designated as a "primary" sub-channel over which beacons are transmitted to facilitate channel discovery (e.g., request beacons answered with response beacons to determine whether a particular channel is operational). While this requirement still holds true in the 6 GHz frequency band, active probing is discouraged in the 6 GHz frequency band because there are so many channels and it is no longer efficient for initial AP discovery.

To resolve these deficiencies in scanning and channel discovery, wireless AP devices designed to handle the new Wi-Fi® 6E standard can be configured as tri-band APs that communicate over all three frequency bands, e.g., 2.4 GHz, 5 GHz, and 6 GHz frequency bands. These frequency bands, in reality, involve frequency ranges defined by each frequency band having a corresponding center frequency. Similarly, Wi-Fi® 6E client radios can also have 2.4 GHz and 5 GHz capability. A tri-band AP can inform a Wi-Fi® 6E client that is actively probing the 2.4 GHz or 5 GHz bands about an existing 6 GHz radio co-located in the wireless AP device.

A clearly defined out-of-band discovery method to inform 6E client wireless devices about the operating channel of the 6 GHz wireless AP device has been introduced in the form of a Reduced Neighbor Report (RNR). The RNR is an informational element or packet that can be used to include information about a neighbor wireless AP device. A 6E client wireless device can learn about the available 6 GHz radio from the RNR information in either beacon or probe response frames sent by the 2.4 GHz or 5 GHz radios of the wireless AP device. In this way, the 6E client wireless devices can perform the same type of discovery within the more limited 2.4 GHz and/or 5 GHz bands that experience more typical delays. Once the RNR is received and the 6 GHz channel information accessed, the 6E client wireless devices can directly connect to the operating channel of the wireless AP device. The IEEE 802.11k and 802.11r are industry standards that enable seamless Basic Service Set (BSS) transitions in a wireless local area network (WLAN) environment. For example, the IEEE 8021.11k standard provides information to discover the best available nearby wireless AP.

While the RNR and out-of-band discovery just discussed provide a solution for connecting to a tri-band wireless AP device, this method is not available to single-band access wireless AP devices such as simple mobile devices (e.g., smart phone, tablet, or other mobile handset) that are band-limited. For purposes of explanation, these single-band access wireless AP devices are considered to be 6 GHz-only wireless AP devices, but the present embodiments can be extended to 5 GHz-only wireless AP devices as well, as will be explained. Mobile devices, for example, may perform the role of a single-band access wireless AP device when functioning as a hotspot for other mobiles devices to connect to for network connectivity. Because mobile devices are so ubiquitous and connecting using hotspots or similar methods is common, the previously mentioned scanning-based latencies will persist in many Wi-Fi®-related scenarios in practical reality.

Aspects of the present disclosure address the above and other deficiencies by configuring client wireless devices to also have the capability of acting in a dual-role, that of station (STA) sometimes and that of soft (or limited) wireless AP at other times. Consider an initial wireless device that is performing the function of a single-band wireless AP device (e.g., as a hotspot) and a first wireless device (STA1) that is performing this dual-role in order to aid other wireless devices in the area to connect to the single-band wireless AP device. The first wireless device can be configured to operate in virtual simultaneous dual-band (VSDB) mode via time division multiplexing (TDM) scheduling, for example.

In at least some embodiments, the STA1 wireless device first establishes a communication link with the wireless AP device over an operating channel of the wireless AP device that provides a single-band access within a first frequency band. While the first frequency band is explained primarily as the 6 GHz frequency band, embodiments can be extended to the first frequency band being the 5 GHz frequency band. The STA1 wireless device can then time-multiplex transmitting beacons or probes within a second frequency band (e.g., 5 GHz or 2.4 GHz band) with communicating with the wireless AP device over the operating channel within the first frequency band (e.g., 6 GHz). These beacons or probes can advertise, to other wireless devices in the second frequency band, availability of connection to the wireless AP device over the operating channel within the first frequency band. The beacons can include any of standard beacons, fast initial link setup (FILS) discovery beacons, or FILS discovery frames and the probes can include any of probe responses or unsolicited probes or the like.

In these embodiments, the STA1 wireless device can further receive a probe request from a second wireless device (e.g., STA2) and provide a probe response that includes information indicative of the operating channel within the first frequency band, e.g., which can include the RNR. Once the second wireless device has this information, the second wireless device can directly connect to the wireless AP device over the discovered operating channel, without having to scan the PSC 6E channels. This process can be repeated for many other wireless station devices (STAs) to help other STAs to also discover the operating channel of the single-access wireless AP device.

Advantages of the present disclosure include, but are not limited to providing the out-of-band channel discovery results that significantly reduce latencies in discovering and connecting to a wireless AP device also available in the context of a single-band access device that is band-limited, e.g., to the 6 GHz frequency band. Experiments have confirmed that discovery latency can be improved by a significant 98% and 97%, respectively, when target wireless AP devices are found on channel 1 and channel 233 of the 6 GHz frequency band, only by way of example. These and other advantages that would be apparent to those skilled in the art will be apparent from the following more detailed discussion.

FIG. 1 is a simplified block diagram of a wireless network 100 including a first wireless device 108 acting as a dual-role station (STA1) to help inform other wireless devices, such as a second station 110 (STA2) and third station 112 (STA3), of an operating channel within a frequency band of a single-band wireless AP device 102 according to various embodiments. The wireless AP device 102 and the wireless stations 108, 110, and 112 can each be a client station or end user equipment. The single-band frequency is, for example, within the 6 GHz frequency band or the 5 GHz frequency band in different embodiments. The first wireless device 108, in operating as a dual-role STA1, can operate both as a wireless station 108A (STA) to the wireless AP device 102 and a wireless AP device 108B to other wireless stations. But, because the first wireless device 108 is assumed to include a single radio as do many small or medium-sized mobile devices, the first wireless device 108 can be configured to operate in VSDB mode via time-multiplexing, e.g., TDM scheduling between these two different roles.

More specifically, in at least some embodiments, the first wireless device 108 (or STA1) establishes a communication link with a wireless access point (AP) device over an operating channel in a first frequency band. In these embodiments, the wireless AP device is the single-band wireless AP device 102 that provides a single-band access within the first frequency band. While this disclosure is most applicable to the first frequency band being the 6 GHz frequency band, the first frequency band can also be the 5 GHz frequency band. The first wireless device 108 can further time-multiplex, e.g., via TDM scheduling, transmitting beacons or probes within a second frequency band with communicating with the wireless AP device over the operating channel of the first frequency band. In different embodiments, the second frequency band is the 5 GHz frequency band (if the first frequency band is the 6 GHz frequency band) or is the 2.4 GHz frequency band.

In some embodiments, once the first wireless device 108 is associated with wireless AP device 102, wireless hardware of the first wireless device 108 independently and automatically transitions to operating in a dual mode of operation that includes the station and wireless AP roles. In other embodiments, the first wireless device 108 transitions to time-multiplexing in the dual mode of operation in response to receipt of one of input/output variable (IOVAR) or input/output control (IOCTR) messages from a host system operating on the first wireless device 108, e.g., and thus can be user controlled. The IOVAR and IOCTR messages are employed by applications hosted on a wireless device to communicate with wireless hardware of the wireless device.

In at least some embodiments, the first wireless device 108 (or STA1) operates on two channels for a pre-determined duration of time, switching between these channels on a time-sharing basis. This dual-role STA1 can act as a full-fledged station on the operating channel on which the wireless AP device 102 operates. The dual-role STA1 can further act as a limited-functionality access point on a preferred-scanning channel in a different band (e.g., the second frequency band) where the dual-role STA1 advertises the presence of the wireless AP device 102. This advertisement can be part of Neighborhood Reports (NR) or Reduced Neighborhood Reports (RNR) in outgoing beacons. Further, the dual-role STA1 can also include these advertisements in unsolicited probe responses and FILS discovery frames. Future stations that enter the area can receive the neighborhood reports when scanning and determine the operating channel and frequency band on which the wireless AP device 102 is operating and to which these other stations need to associate.

In various embodiments, the beacons or probes advertise availability of connection to the single-band wireless AP device 108 over the operating channel. In these embodiments, the beacons can be any of standard beacons, fast initial link setup (FILS) discovery beacons, or FILS discovery frames, and the probes can be probe responses or unsolicited probes. The IEEE 802.11ai standard employs the use of FILS discovery beacon broadcast by access points for enabling access point discovery by wireless stations. The FILS discovery beacon can be a frame or packet. The terms FILS discovery beacon and FILS discovery frame are used herein interchangeably. Wireless stations discover an access point by detecting a FILS discovery beacon transmitted repeatedly from the access point at shorter or faster subsequent time intervals (e.g., frequency) than a typical or standard beacon, which is typically transmitted at a period of 100 ms or other frequency according to IEEE 802.11 standards. The FILS discovery beacon or frame can be transmitted with or in lieu of the standard beacon. However, the FILS discovery beacon has a modified format that includes less information than the standard beacon format. The reduced size of the FILS discovery beacon in comparison to a typical or regularly transmitted beacon avoids occupying substantial air time by the beacon broadcasts.

In at least some embodiments, the first wireless device 108, acting in a station role, receives a probe request from the second wireless device 110. The first wireless device 108 then provides a probe response to the probe request that includes information including the operating channel within the first frequency band. The second wireless device 110 can then establish a second communication link with the wireless AP device 102 over the operating channel without having to directly scan the wireless AP device 102 for its operating channel. Further, in these embodiments, the first wireless device 108 provides, to the wireless AP device 102, an off-channel notification that triggers the wireless AP device 102 to temporarily buffer packets destined for the wireless device when the first wireless device 108 is transmitting the beacons during the time-multiplexing. In some embodiments, the off-channel notification is a packet or frame sent over a proprietary or different frequency (e.g., within one of the 20 MHz channels of the operating channel) so as to be inaccessible to other STAs that are communicating over the second frequency band, for example.

In these embodiments, with reference to the second wireless device 110 (or STA2), the second wireless device 110 can include a baseband processor (see FIG. 2) that is configured to receive a beacon or probe from the first wireless device 108, which is operating in its dual-role as a limited-operational access point (e.g., as the wireless AP device 108B), over a first operating channel within the second frequency band. The second wireless device 100 can then detect, within a beacon or a probe received from the first wireless device 108, information associated with a wireless AP device 102 having a single-band access within the first frequency band that is higher than the second frequency band. The second wireless device 110 can then determine, from the information, a second operating channel of the wireless AP device 102 within the first frequency band and establish a second communication link directly with the wireless AP device 102 over the second operating channel. In some embodiments, to establish the second communication link directly with the wireless AP device, the second wireless device 108 is to initiate an association procedure with the wireless AP device 102 in response to determining the operating channel of the wireless AP device. This association procedure will be discussed in more detail with reference to FIG. 3B.

In some embodiments, the baseband processor further detects the first operating channel of the second wireless device 110 by scanning multiple channels within the first frequency band to detect the first operating channel. In other embodiments, the baseband processor further directly connects to the first operating channel that is a priori stored as a proprietary channel of operation. This can be the case in some proprietary mobiles devices, such as game consoles or controllers, that automatically default to the proprietary channel over which to operate.

Figure 2:
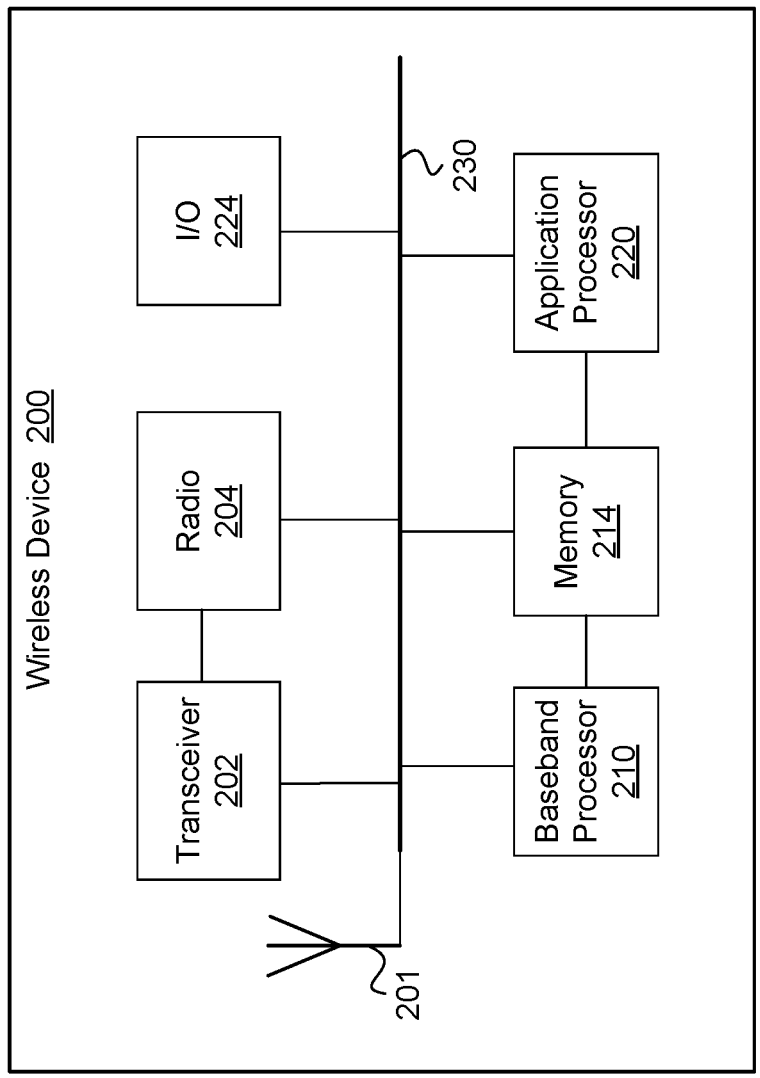
FIG. 2 is a simplified schematic diagram of a wireless device that is representative of any of the wireless AP devices and wireless devices (STAs) discussed herein according to some embodiments.

FIG. 2 is a simplified schematic diagram of a wireless device 200 that is representative of any of the wireless AP devices and wireless devices (STAs) discussed herein according to some embodiments. The wireless device 200 can include, but not be limited to, one or more antennas 201, a transceiver 202 (e.g., that includes a transmitter and a receiver) coupled to the one or more antennas 201, a radio 204 coupled to the transceiver 202, a baseband processor 210, a memory 214, an application processor 220, and one or more input/output (I/O) devices 224 such as a microphone, a speaker, a display screen, and the like. These components can all be coupled to a communication bus 230 and thus be interconnected.

In some embodiments, the radio 204 includes analog radio frequency (RF) circuitry and/or RF modules for sending and receiving RF signals via the transceiver 202. In these embodiments, the baseband processor 210 includes logic in the form of hardware, software, or a combination thereof that modulates data into the RF signals transmitted by the radio 204 or extracts data (and other information) out of the RF signals received by the radio 204. Thus, in at least some embodiments, the baseband processor 210 is integrated within the radio 204 to direct the functions of the radio 204. The memory 214 (e.g., a non-transitory computer-readable medium) can store software instructions or other code executed by the baseband processor 210 to perform at least some of the operations discussed herein.

In at least some embodiments, the application processor 220 executes host applications to include a host operating system (OS), e.g., which can also be stored in the form of executable instructions or code in the memory 214. As was discussed, the application processor 220 can generate IOVAR or IOTC messages, which the OS or an application being run on the OS of the wireless device 200 communicates with the baseband processor 210 and/or the circuitry of the radio 204. For example, the IOVAR or IOTC messages can take the form of commands sent by an application layer that direct the radio 204 and/or the baseband processor 210, the latter of which operate at a physical layer (PHY) and a medium access control (MAC) layer of the wireless device 200.

The one or more antennas 201 described herein within various devices can be used for Long Term Evolution (LTE) frequency bands, third generation (3G) frequency bands or higher generations, Wi-Fi® and Bluetooth® frequency bands or other wireless local area network (WLAN) frequency bands, including Zigbee®, Z-wave™ or the like, wide area network (WAN) frequency bands, global navigation satellite system (GNSS) frequency bands such as global positioning system (GPS) frequency bands, or the like.

Figure 3:
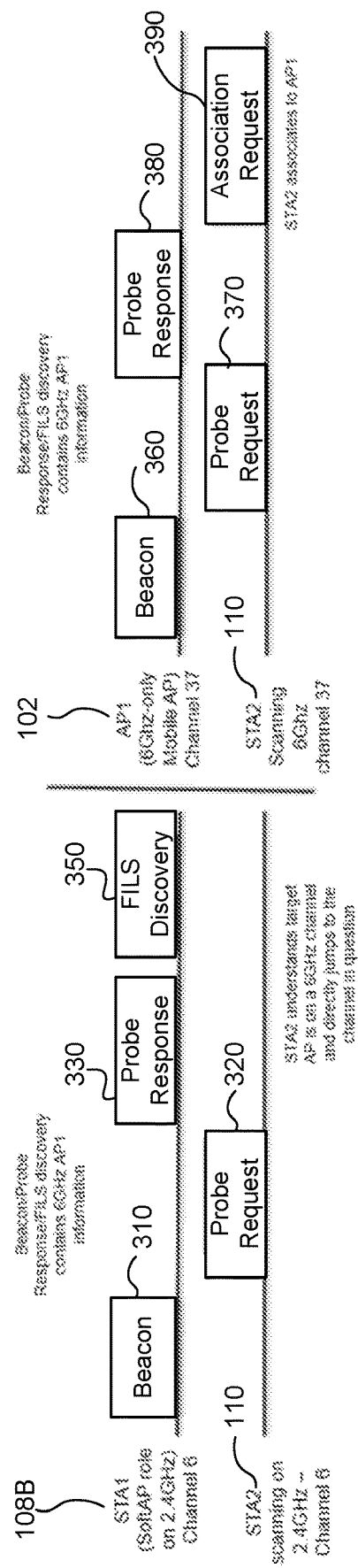
FIG. 3A is a discovery flowchart illustrating operations by which the first wireless device (dual-role STA1) is able to inform a second wireless device (STA2) of the operating channel of the wireless AP according to some embodiments.
FIG. 3B is a discovery flowchart illustrating operations by which the second wireless device (STA2) is able to connect to the wireless AP device using the operating channel information obtained from the first wireless device according to an embodiment.

FIG. 3A is a discovery flowchart illustrating operations by which the first wireless device (dual-role STA1) is able to inform a second wireless device (STA2) of the operating channel of the wireless AP according to some embodiments. While specific frequency bands and channels are illustrated in FIGS. 3A-3B, these are illustrated only by way of example and are not to detract from the previous more generalized discussion.

As discussed previously, according to at least some embodiments, the first wireless device 108 (STA1), operating as the wireless AP device 108B, sends out beacons 310 (e.g., standard beacons) over the second frequency band, which in this example, is Channel 6 of the 2.4 GHz frequency band. These beacons can include channel information to include the operating channel of the wireless AP device 102 after the first wireless device 108 has associated (e.g., established a communication link) with the wireless AP device 102. In this way, once the second wireless device 110 (STA2) has received a beacon from the first wireless device 108 on Channel 6, the second wireless device 110 can extract this channel information and determine the operating channel of the wireless AP device 102.

Alternatively, the second wireless device 110 can send a probe request 320 on Channel 6 during scanning for a channel of the wireless AP device 108B, and the first wireless device 108 can send a probe response 330 to the second wireless device 110 in response to the probe request 320. In this embodiment, the probe response 330 includes the channel information referred to previously. In still another embodiment, the first wireless device 108, acting as the wireless AP device 108B, sends out a FILS discovery beacon or FILS discovery frames 350 that likewise includes the channel information referred to previously. By at least one of these methods, the second wireless device 110 (STA2) detects or determines the operating channel of the wireless AP device 102 and is subsequently able to directly establish a communication link with the wireless AP device 102 without performing scanning through multiple 6E preferred scanning channels.

FIG. 3B is a discovery flowchart illustrating operations by which the second wireless device 110 (STA2) is able to connect to the wireless AP device 102 using the operating channel information obtained from the first wireless device according to an embodiment. According to some embodiments, once the second wireless device 110 has jumped to the operating channel (e.g., Channel 37 of the 6 GHz frequency band in this example), the second wireless device 110 initiates an association procedure with the wireless AP device 102 in response to determining the operating channel. The second wireless device 110 can then establish a second communication link with the wireless AP device 102 over the operating channel, e.g., Channel 37 of the 6 GHz frequency band.

In various embodiments, the second wireless device 110 can perform the initiating of the association procedure with the wireless AP device 102 in different ways. For example, the wireless AP device 102 can also issue beacons 360 that includes 6 GHz channel association information for the wireless AP device 102, which the second wireless device 110 can directly access and use to initiate the association or communication link with the wireless AP device 102. In another embodiment, the second wireless device 110 sends a probe request 370 to the wireless AP device 102, in response to which the wireless AP device 102 send back a probe response containing the channel association information. In other embodiments, the second wireless device 110 sends an association request 390 or performs other FILS-based discovery with the wireless AP device 102, such as was discussed previously with reference to the first wireless device 108.

Figure 4:
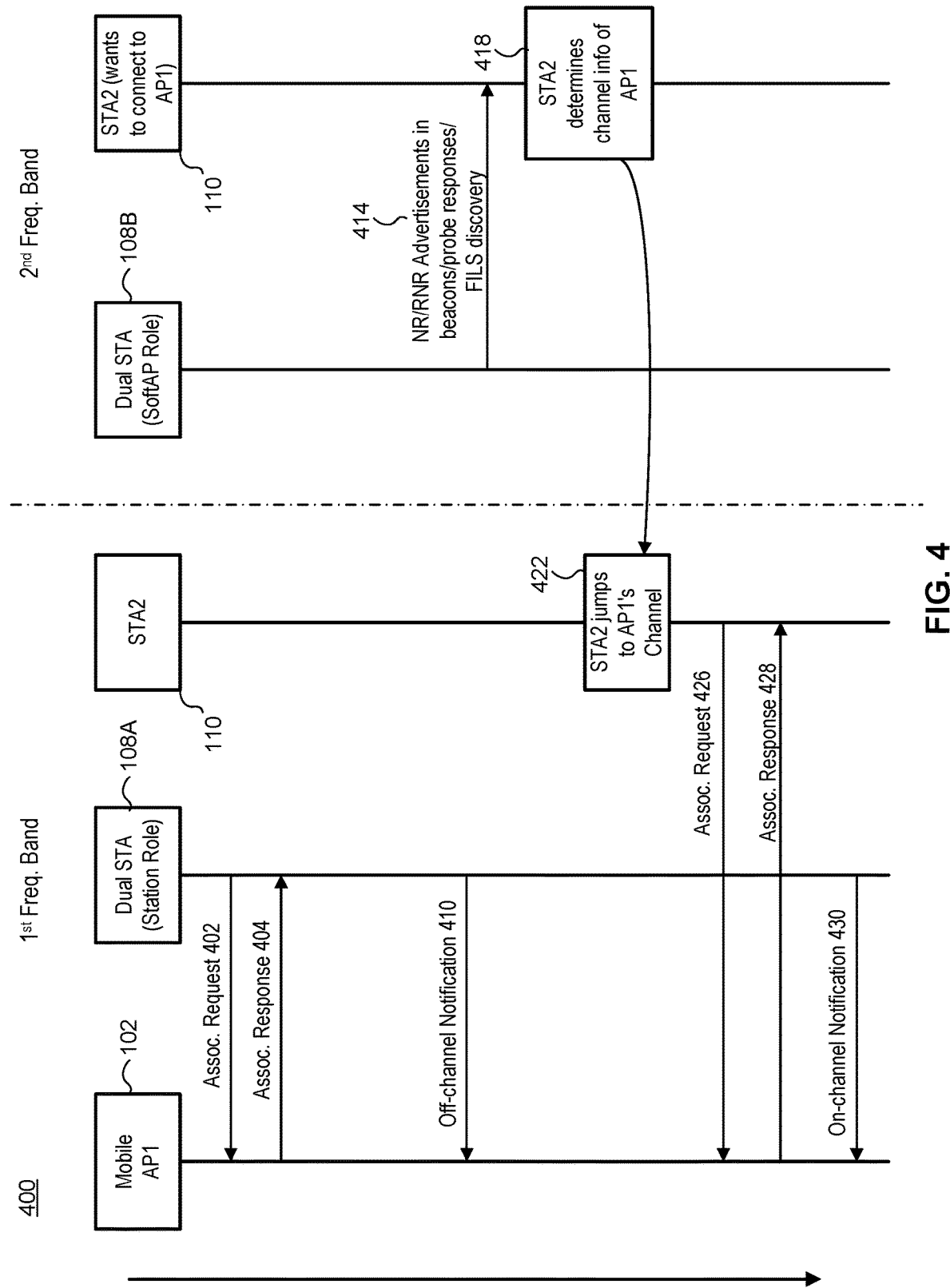
FIG. 4 is a discovery flowchart depicting example operations of the wireless AP device (AP1), the first wireless device (or dual-role STA1), and the second wireless device (STA2) that facilitate peer-assisted, out-of-band discovery of the single-band access wireless AP device according to various embodiments.

FIG. 4 is a discovery flowchart depicting example operations 400 of the wireless AP device 102 (AP1), the first wireless device (or dual-role STA1), and the second wireless device (STA2) that facilitate peer-assisted, out-of-band discovery of the single-band access wireless AP device according to various embodiments. Although the example operations 400 are illustrated with specificity, other operations or modes discussed herein that are not specifically employed can also be employed within the example operations 400.

In at least some embodiments, the example operations 400 begin with, at operation 402, the first wireless device 108, acting as the wireless station 108A, requesting associating with the wireless AP device 102. At operation 404, the first wireless device 102 provides an association response by which a communication link is established between the first wireless device 108 and the wireless AP device 102 over an operating channel within the first frequency band. At operation 410, the first wireless device 108 transmits an off-channel notification to the wireless AP device 102 that triggers the wireless AP device to temporarily buffer packets destined for the first wireless device 108 when the first wireless device 108 is transmitting the beacons or probes during the time-multiplexing that was previously discussed.

At operation 414, the first wireless device 108, acting as the wireless AP device 108B in a limited AP role, sends out NR/RNR advertisements in beacons or probes over a channel within the second frequency band. In various embodiments, the second frequency band includes a lower frequency range compared to a frequency range of the first frequency band. In these embodiments, the beacons are standard beacons, FILS discovery beacons, or FILS discovery frames and the probes are probe responses or unsolicited probes. At operation 418, the second wireless device 110 (STA2) determines channel information, including the operating channel, of the wireless AP device 102 from the beacons or probes received from the first wireless device 108B. At operation 422, the second wireless device 110 (or STA2) jumps to the operation channel of the wireless AP device 102.

At operation 426, the second wireless device 110 requests association with the wireless AP device 102, which can also be understood as initiating an association procedure with the wireless AP device 102 in response to jumping to the operating channel. At operation 428, the wireless AP device 102 responds to the association request from the second wireless device 110, e.g., to establish a communication link with the second wireless device 110 over the operating channel within the first frequency band. At operation 430, the first wireless device 108, again acting as the wireless station 108A, transmits an on-channel notification that triggers the wireless AP device 102 to release the buffered packets to the first wireless device 108 and resume communication as normal.

Figure 5:
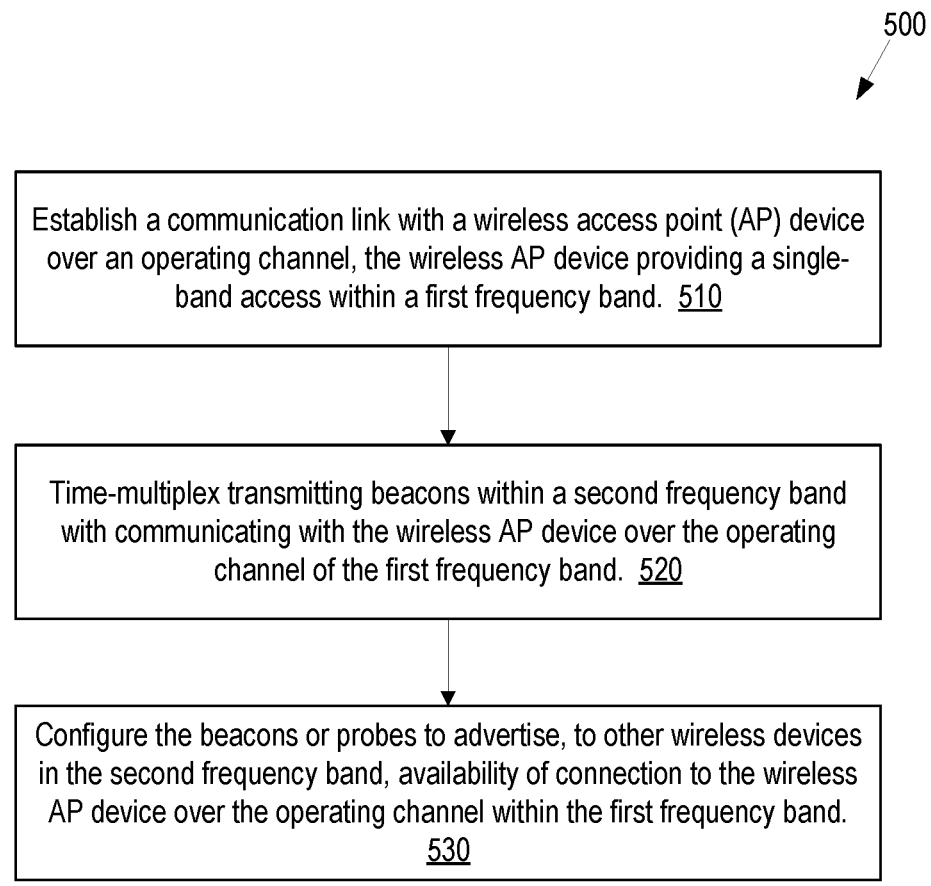
FIG. 5 is a flow diagram of an example method of a dual-role wireless device performing both roles in facilitating peer-assisted, out-of-band discovery of a single-band access AP device according to at least one embodiment.

FIG. 5 is a flow diagram of an example method 500 of a dual-role wireless device performing both roles in facilitating peer-assisted, out-of-band discovery of a single-band access AP device according to at least one embodiment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the first wireless device 108 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic establishes a communication link with a wireless access point (AP) device over an operating channel, the wireless AP device providing a single-band access within a first frequency band. For example, the wireless AP device can be the wireless AP device 102 (AP1) referred to previously. Further, the first frequency band can be a 5 gigahertz (GHz) or a 6 GHz frequency band.

At operation 520, the processing logic time-multiplexes transmitting beacons or probes within a second frequency band with communicating with the wireless AP device over the operating channel within the first frequency band. For example, the second frequency band can be a 2.4 GHz or 5 GHz frequency band, or some other band having a lower frequency range compared to a frequency range of the first frequency band. Further, the beacons can include standard beacons, fast initial link setup (FILS) discovery beacons, FILS discovery frames, or a combination thereof. The probes can include probe responses, unsolicited probes, or a combination thereof.

At operation 530, the processing logic configures the beacons or probes to advertise, to other wireless devices in the second frequency band, availability of connection to the wireless AP device 102 over the operating channel within the first frequency band.

Figure 6:
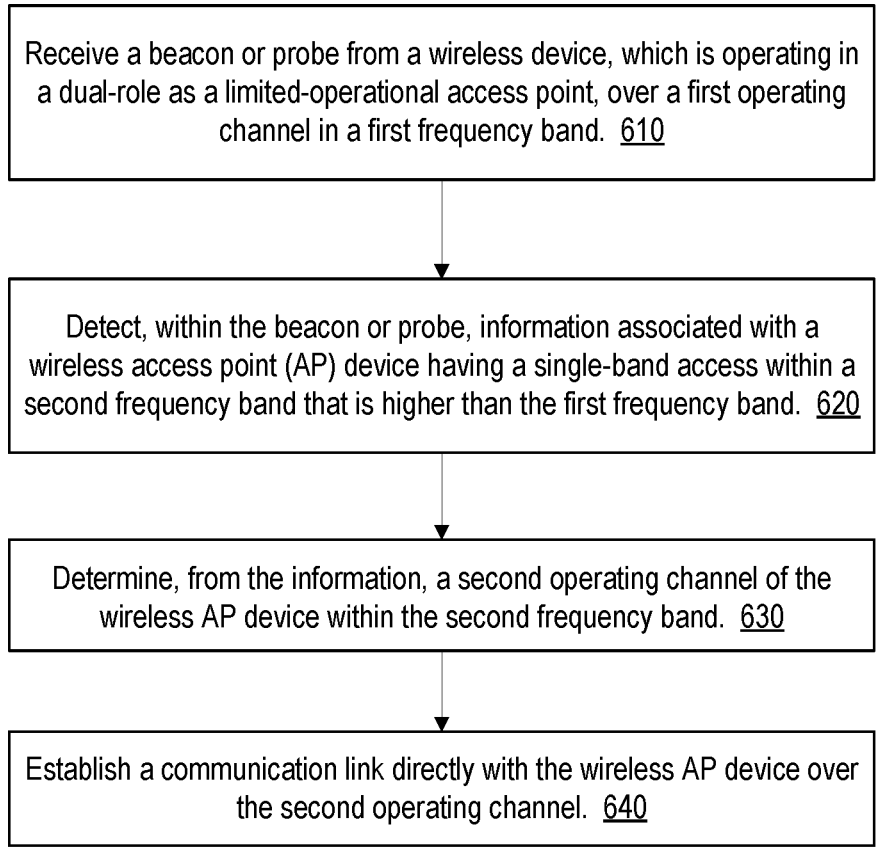
FIG. 6 is a flow diagram of an example method of the second wireless device (STA2) interacting with the dual-role wireless device (STA1) in order to connect to the operating channel of the wireless AP according to at least one embodiment.

FIG. 6 is a flow diagram of an example method 600 of the second wireless device (STA2) interacting with the dual-role wireless device (STA1) in order to connect to the operating channel of the wireless AP according to at least one embodiment. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the second wireless device 110 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic receives a beacon or probe from a wireless device, which is operating in a dual-role as a limited-operational access point, over a first operating channel in a first frequency band. In some embodiments, the wireless device is the first station (STA1). In some embodiments, the first frequency band is a 2.4 GHz or 5 GHz frequency band.

At operation 620, the processing logic detects, within the beacon or probe received from the wireless device, information associated with a wireless access point (AP) device having a single-band access within a second frequency band that is higher than the first frequency band. For example, the wireless AP device can be the wireless AP device 102 (AP1) referred to previously. The processing logic can also extract and/or parse the detected information from the beacon or probe as well.

At operation 630, the processing logic determines, from the information, a second operating channel of the wireless AP device within the second frequency band. For example, the second frequency band can be a 5 GHz or a 6 GHz frequency band, or some other frequency band having a frequency range that is higher than the frequency range of the first frequency band.

At operation 640, the processing logic establishes (or causes to be established) a communication link directly with the wireless AP device 102 over the second operating channel. In this way, the dual-role wireless device aids the second wireless device 110 in determining the second operating channel and connecting to the wireless AP device 102 over the second operating channel.

Reference throughout this specification to "one embodiment" or "an embodiment" means that a particular feature, structure, or characteristic described in connection with the embodiment (e.g., particular implementation) is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment, embodiment, and/or other exemplarily language does not necessarily refer to the same embodiment or the same example, but may refer to different and distinct embodiments, as well as potentially the same embodiment.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
   establishing, by a wireless device, a communication link with a wireless access point (AP) device over an operating channel, the wireless AP device providing a single-band access within a first frequency band;
   time-multiplexing, by the wireless device, transmitting beacons or probes within a second frequency band with communicating with the wireless AP device over the operating channel within the first frequency band; and
   configuring the beacons or probes to advertise, to other wireless devices in the second frequency band, availability of connection to the wireless AP device over the operating channel within the first frequency band.

2. The method of claim 1, wherein the second frequency band comprises a lower frequency range compared to a frequency range of the first frequency band, and wherein the beacons comprise one of standard beacons, fast initial link setup (FILS) discovery beacons, or FILS discovery frames and the probes comprise one of probe responses or unsolicited probes.

3. The method of claim 2, wherein the first frequency band is one of a 5 gigahertz (GHz) or a 6 GHz frequency band, and the second frequency band is one of a 2.4 GHz or 5 GHz frequency band.

4. The method of claim 1, further comprising providing, to the wireless AP device, an off-channel notification that triggers the wireless AP device to temporarily buffer packets destined for the wireless device when the wireless device is transmitting the beacons or probes during the time-multiplexing.

5. The method of claim 1, further comprising:
   receiving, by the wireless device, a probe request from a second wireless device; and
   providing, to the second wireless device, a probe response to the probe request that includes information comprising the operating channel within the first frequency band.

6. The method of claim 1, further comprising:
   determining, by a second wireless device from the beacons or probes, the operating channel within the first frequency band;
   initiating, by the second wireless device, an association procedure with the wireless AP device in response to the determining; and
   establishing, by the second wireless device, a second communication link with the wireless AP device over the operating channel.

7. A wireless device comprising:
   a radio coupled with a transceiver; and
   a baseband processor coupled with the radio, wherein the baseband processor is configured to:
      receive a beacon or probe from a second wireless device, which is operating in a dual-role as a limited-operational access point, over a first operating channel in a first frequency band;
      detect, within the beacon or probe, information associated with a wireless access point (AP) device having a single-band access within a second frequency band that is higher than the first frequency band;
      determine, from the information, a second operating channel of the wireless AP device within the second frequency band; and
      establish a communication link directly with the wireless AP device over the second operating channel.

8. The wireless device of claim 7, wherein the beacon comprises one of a standard beacon, a fast initial link setup (FILS) discovery beacon, or a FILS discovery frame and the probe comprises one of a probe response or an unsolicited probe.

9. The wireless device of claim 7, wherein the first frequency band is one of a 2.4 GHz or 5 GHz frequency band, and wherein the second frequency band is one of a 5 gigahertz (GHz) or a 6 GHz frequency band.

10. The wireless device of claim 7, wherein the baseband processor is further to detect the first operating channel of the second wireless device by scanning a plurality of channels within the first frequency band.

11. The wireless device of claim 7, wherein the baseband processor is further to directly connect to the first operating channel of the second wireless device that is a priori stored as a proprietary channel of operation.

12. The wireless device of claim 7, wherein to establish the communication link directly with the wireless AP device, the baseband processor is to initiate an association procedure with the wireless AP device in response to determining the second operating channel of the wireless AP device.

13. The wireless device of claim 7, wherein the wireless device and the second wireless device is each one of a client station or end user equipment.

14. A wireless network comprising:
   a wireless access point (AP) device operating over a first operating channel within a first frequency band, the wireless AP device to provide a single-band access;
   a first wireless device configured to:
      establish a first communication link with the wireless AP device over the first operating channel; and
      time-multiplex transmitting beacons or probes within a second frequency band with communicating with the wireless AP device over the first operating channel, wherein the beacons or probes advertise availability of connection to the wireless AP device over the first operating channel; and
   a second wireless device configured to:
      receive, from the first wireless device, a beacon or probe over a second operating channel within the second frequency band;
      detect, within the beacon or probe, information indicative of the first operating channel of the wireless AP device; and
      establish a second communication link directly with the wireless AP device over the first operating channel.

15. The wireless network of claim 14, wherein the first wireless device is further to provide, to the wireless AP device, an off-channel notification that triggers the wireless AP device to temporarily buffer packets destined for the first wireless device when the first wireless device is transmitting the beacons or probes during time-multiplexing.

16. The wireless network of claim 14, wherein the second frequency band comprises a lower frequency range compared to a frequency range of the first frequency band, the beacons comprise one of standard beacons, fast initial link setup (FILS) discovery beacons, or FILS discovery frames, and the probes comprise one of probe responses or unsolicited probes.

17. The wireless network of claim 16, wherein one of:
   the first frequency band is a 5 gigahertz (GHz) frequency band and the second frequency band is a 2.4 GHz frequency band; or
   the first frequency band is a 6 GHz frequency band and the second frequency band is one of a 2.4 GHz or a 5 GHz frequency band.

18. The wireless network of claim 14, wherein the first wireless device is to transition to time-multiplexing in response to receipt of one of input/output variable (IOVAR) or input/output control (IOCTR) messages from a host system operating on the first wireless device.

19. The wireless network of claim 14, wherein the first wireless device is further to:
   receive a probe request from the second wireless device; and
   provide a probe response to the probe request that includes the information.

20. The wireless network of claim 14, wherein the second wireless device is further to initiate an association procedure with the wireless AP device in response to determining the first operating channel of the wireless AP device.

\* \* \* \* \*